No. 625,955. Patented May 30, 1899.
J. H. KENDLE.
DETACHABLE HANDLE FOR FRYING PANS.
(Application filed Dec. 24, 1898.)

(No Model.)

WITNESSES
John Buckler,
F. A. Stewart.

INVENTOR
John H. Kendle
BY
ATTORNEYS

UNITED STATES PATENT OFFICE.

JOHN HENRY KENDLE, OF BOGNOR, ENGLAND.

DETACHABLE HANDLE FOR FRYING-PANS.

SPECIFICATION forming part of Letters Patent No. 625,955, dated May 30, 1899.

Application filed December 24, 1898. Serial No. 700,271. (No model.)

*To all whom it may concern:*

Be it known that I, JOHN HENRY KENDLE, a subject of the Queen of Great Britain, residing at Bognor, in the county of Sussex, England, have invented certain new and useful Improvements in Detachable Handles for Frying-Pans, of which the following is a full and complete specification, such as will enable those skilled in the art to which it appertains to make and use the same.

This invention relates to frying-pans, sauce-pans, and other vessels of this class used for culinary purposes; and the object thereof is to provide a pan or vessel of this class with a detachable handle and improved means for connecting said handle with said pan or vessel.

The invention is fully disclosed in the following specification, of which the accompanying drawings form a part, in which—

Figure 1:
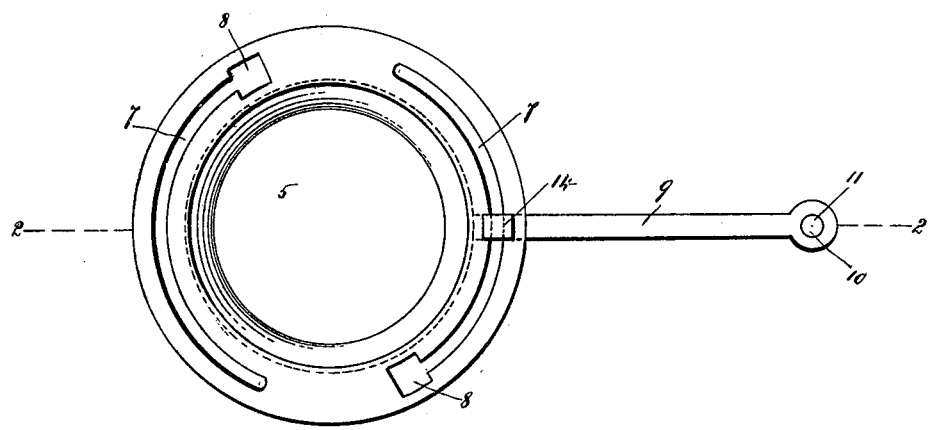
Figure 2:
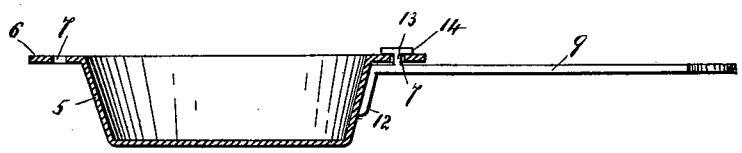

Figure 1 is a plan view of a culinary vessel constructed according to my invention and provided with a handle, and Fig. 2 a partial section on the line 2 2 of Fig. 1.

In the drawings forming part of this specification the separate parts of my improvement are designated by the same numerals of reference in each of the views, and in said drawings I have shown at 5 an ordinary frying-pan, which is provided at the top thereof with an annular flange or rim 6, and formed in said flange or rim 6 are two segmental slots or openings 7.

The slots or openings 7 may be of any desired length, and each of said slots or openings communicates at one end with a rectangular opening 8, formed also in said flange or rim 6, and one of these rectangular openings 8 may be provided at each end of the segmental slots 7, if desired.

I also provide a handle 9, which is provided at one end with a head 10, having an opening 11, by means of which it, together with the pan or vessel when connected therewith, may be suspended from a nail, hook, or other support, and the handle 9 is provided at its opposite end with a downwardly-directed extension 12 and adjacent to said end with an upwardly-directed lug or projection 13, provided with a cross-head 14.

The downwardly-directed extension 12 is not essential and may or may not be employed, and if employed it serves as an additional brace for the handle to make the same more steady and secure.

In connecting the handle with the pan the cross-head 14 of the upwardly-directed lug or projection 13 is passed through one of the angular openings 8, and then the handle is manipulated so as to pass the lug or projection 13 around into the adjacent segmental slot or opening 7, as shown in Fig. 1, in which position the handle will be secured to the frying-pan, and said pan may be manipulated thereby in any desired manner.

The holes or openings 8 need not necessarily be rectangular in form, and it will be apparent that changes in and modifications of the construction described may be made without departing from the spirit of my invention or sacrificing its advantages.

Although I have shown two of the segmental slots 7 and corresponding openings 8, it is evident that but one of said slots need necessarily be employed, the only object in providing two being to render the device more convenient and to facilitate the connection of the handle therewith when the pan is in different positions.

By means of this construction a pan or vessel may be conveniently placed in an oven and turned or manipulated therein in any desired manner, and the handle may be detached therefrom or be connected therewith whenever desired.

Having fully described my invention, I claim as new and desire to secure by Letters Patent—

A frying-pan or similar vessel provided with an annular flange or rim, said flange or rim being provided with an opening, and a segmental slot which communicates with said opening, and a handle provided adjacent to one end with an upwardly-directed lug or projection having a cross-head at its upper end which is adapted to be passed through said opening, said lug or projection being adapted to move in said slot, substantially as shown and described.

In testimony that I claim the foregoing as my invention I have signed my name, in presence of the subscribing witnesses, this 9th day of December, 1898.

JOHN HENRY KENDLE.

Witnesses:
 WALTER LANGER,
 ERNEST KEEPING.